(12) United States Patent
Cohen et al.

(10) Patent No.: US 9,272,490 B2
(45) Date of Patent: Mar. 1, 2016

(54) ACRYLIC/THERMOPLASTIC OLEFIN COMPOSITE

(75) Inventors: Leslie A. Cohen, Langhorne, PA (US); Timothy J. Cavanaugh, Lansdale, PA (US); Elton White, Fairless Hills, PA (US)

(73) Assignee: Arkema France, Colombes (FR)

( * ) Notice: Subject to any disclaimer, the term of this patent is extended or adjusted under 35 U.S.C. 154(b) by 750 days.

(21) Appl. No.: 12/066,542

(22) PCT Filed: Sep. 22, 2006

(86) PCT No.: PCT/US2006/037166
§ 371 (c)(1),
(2), (4) Date: Mar. 12, 2008

(87) PCT Pub. No.: WO2007/038383
PCT Pub. Date: Apr. 5, 2007

(65) Prior Publication Data
US 2008/0220274 A1    Sep. 11, 2008

Related U.S. Application Data

(60) Provisional application No. 60/719,839, filed on Sep. 23, 2005.

(51) Int. Cl.
*B32B 9/04*     (2006.01)
*B29C 47/00*    (2006.01)
*B32B 27/30*    (2006.01)

(52) U.S. Cl.
CPC ......... *B32B 27/30* (2013.01); *Y10T 428/31855* (2015.04)

(58) Field of Classification Search
None
See application file for complete search history.

(56) References Cited

U.S. PATENT DOCUMENTS

| | | | |
|---|---|---|---|
| 6,331,580 B1 * | 12/2001 | Molnar | 523/201 |
| 6,455,171 B2 | 9/2002 | Scheibelhoffer et al. | |
| 6,652,985 B1 | 11/2003 | Tadokoro et al. | |
| 2004/0023037 A1 * | 2/2004 | Baumert et al. | 428/421 |
| 2004/0118514 A1 * | 6/2004 | Gosiewski et al. | 156/330 |
| 2004/0220320 A1 | 11/2004 | Abhari et al. | |
| 2005/0069710 A1 | 3/2005 | Bonnet et al. | |

OTHER PUBLICATIONS

Pardos Marketing: Market Overview: Multilayer Films, Rapra, Brussels 2005. Rapra International Conference Nov. 8-9, 2005, Brussels Belgium. http://www.pardos-marketing.com/paper_b03.htm.*
Amit Dharia, "Influence of Mixing Conditions and Composition on the Phase Structure and Properties of Thermoplastic Olefin Blends"—ANTEC '99 Conference Proceedings, New York City, May 2-6, 1999, vol. II Material.*
Wikipedia:About—Wikipedia, the free encyclopedia. Retrieved on May 14, 2012. http://en.wikipedia.org/wiki/Wikipedia:About.*

* cited by examiner

*Primary Examiner* — Coris Fung
(74) *Attorney, Agent, or Firm* — Thomas F. Roland

(57) ABSTRACT

The invention relates to a composite consisting of an impact-modified acrylic capstock or film on a thermoplastic olefin (TPO). A tie-layer containing a functionalized olefin-acrylic is used to improve the adhesion of the acrylic layer to the TPO and to improve the overall melt processing of the three-layer composite.

7 Claims, No Drawings

US 9,272,490 B2

ACRYLIC/THERMOPLASTIC OLEFIN COMPOSITE

This application claims benefit, under U.S.C. §119 or §365 of PCT application PCT/US2006/037166 filed Sep. 22, 2006 and U.S. Provisional application No. US 60/719,839, filed Sep. 23, 2005.

FIELD OF THE INVENTION

The invention relates to a composite consisting of an impact-modified acrylic capstock or film on a thermoplastic olefin (TPO). A tie-layer containing a functionalized olefin-acrylic is used to improve the adhesion of the acrylic layer to the TPO and to improve the overall melt processing of the three-layer composite.

BACKGROUND OF THE INVENTION

TPOs are used in many applications, as they are strong, easy to form into final-use parts, and are inexpensive. Unfortunately, TPOs suffer from several deficiencies such as being a soft material, having a narrow thermoforming window, having poor abrasion resistance and having poor weatherability. Impact acrylic polymers are well known for their clarity, toughness, sparkling color, surface gloss, mar resistance and weather resistance.

A composite of an acrylic composition over a TPO would allow the composite to have the best of both materials. Unfortunately, polar acrylic materials do not bond well to non-polar TPOs. Attempts to form composites of these two materials have been plagued by poor adhesion of the layers, especially after temperature cycling.

US 20050069710 describes a multi-layer film of a polyolefin with a functionalized acrylic (polymethylmethacrylate plus a functional acid, acid chloride, alcohol, or anhydride functionality). The multi-layer functionalized film uses a tie layer of an ethylene/alkyl (meth)acrylate/epoxide terpolymer as a tie-layer.

U.S. Pat. No. 6,696,117 describes the use of an ethylene/methyl acrylate/glycidyl methacrylate tie layer to improve the bonding between a fluoropolymer layer and a TPO.

U.S. Pat. No. 6,455,171 describes a composite of an acrylic layer on a polyolefin using a ethylene/methyl acrylate/glycidyl methacrylate tie layer. There is no mention of an impact modified acrylic.

U.S. Pat. No. 6,652,985 claims an acrylic film having an outer layer with a 6-member ring acid anhydride unit, and a tie layer for use over polyolefin based plastic. The outer layer is claimed to contain no acrylic impact modifier.

Surprisingly it has been found that the use of an impact modified acrylic layer, in combination with a functionalized olefin-acrylate-tie layer provides enhanced adhesion of the acrylic layer to the tie-layer and to TPO compared to a (meth) acrylate layer without impact modifier. Additionally, the impact acrylic provides additional impact resistance to the composite and is less detrimental to TPO/acrylic rework blends. Further, the functionalized olefin-acrylate tie layer may be a blend with an impact acrylic, which is easily melt processable on an extruder while the functionalized olefin-acrylate is not as easily processed. The use of the acrylic top layer provides a clear coat/TPO structure that has an improved thermoforming processing window, better abrasion resistance, and improved gloss. The chemical resistance of the top layer is also improved.

SUMMARY OF THE INVENTION

The invention relates to an acrylic film or sheet for use on a thermoplastic olefin substrate comprising:

a) an impact modified acrylic layer; and
b) a functionalized olefin acrylic tie layer, or functionalized olefin acrylic tie-layer blend or acrylic/functionalized olefin acrylic tie-layer blend.

The invention further relates to a composite material comprising, in order:

a) an impact-modified acrylic polymer layer;
b) a layer of a functionalized olefin-acrylate blended with impact acrylic; and
c) a thermoplastic polyolefin substrate.

The invention further relates to a process for forming an acrylic/thermoplastic olefin composite comprising:

a. forming by co-extrusion, a film, or sheet, or solvent casting, comprising an impact modified acrylic and a functionalized olefin acrylic tie layer, and or functionalized olefin-acrylate/impact acrylic blend tie layer;
b. laminating said film of step a) onto a thermoplastic olefin substrate.

DETAILED DESCRIPTION OF THE INVENTION

The invention relates to a composite having an impact-modified acrylic layer, a tie layer containing a functionalized olefin acrylic and optionally impact acrylic, and a TPO layer. The composite can be formed by several different means.

The impact modified acrylic is used as an outer layer of the composite and provides tough, and weatherable properties to the composite. The impact-modified acrylic is an acrylic polymer matrix containing one or more impact modifiers.

The acrylic polymer matrix includes polymers, copolymers and terpolymers formed from alkyl methacrylate and alkyl acrylate monomers, and mixtures thereof. The alkyl methacrylate monomer is preferably methyl methacrylate, which may make up from 60 to 100 weight percent of the monomer mixture. 0 to 40 weight percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Preferably acrylic anhydrides are not used as monomers nor are they formed intentionally in situ in the copolymer. Small levels of multifunctional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like. Styrenic monomers such as styrene and alpha-methyl styrene could also be incorporated into the polymer.

The acrylic matrix includes from 3 to 60 percent by weight, of one or more impact modifiers. Preferred impact modifiers are core-shell multi-layer polymers and block copolymers having at least one hard and at least one soft block. The core-shell (multi-layer) impact modifiers could have a soft (rubber or elastomeric) core and a hard shell; a hard core covered with a soft elastomeric-layer, and a hard shell; of other core-shell morphology known in the art. The rubber layers are composed of low glass transition (Tg) polymers, including, but not limited to, butyl acrylate (BA), ethylhexyl acrylate (EHA), butadiene (BD), BD/styrene, butylacrylate/styrene, and many other combinations. The addition of the impact modifier both improves the low-temperature impact resistance of the composite, the impact of the TPO acrylic rework blend, and also improves the adhesion of the acrylic layer to the tie-layer and to the TPO.

In addition to impact modifiers, the acrylic matrix of the invention may contain other typical polymer additives, such as anti-oxidants, dyes, colorants, hindered amine light stabilizers, UV absorbers, lubricants and fillers.

The impact modified acrylic polymer layer may optionally have a thin acrylic or acrylic/fluoropolymer coating layer on the surface exposed to the environment.

The tie layer contains a functionalized olefin acrylic polymer. The olefin is preferably an ethylene or propylene, the acrylic is a $C_{1-8}$ alkyl (meth)acrylate, and the functionalization is preferably an anhydride, or an unsaturated epoxide. Unsaturated epoxides include, but are not limited to, aliphatic glycidyl esters and ethers, such as allyl glycidyl ether, vinyl glycidyl ether, glycidyl maleate and glycidyl itaconate, glycidyl (meth)acrylate; and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo-[2.2.1]hept-5-ene-2,3-dicarboxylate. In one embodiment, the functionalized olefin acrylic is a terpolymer of ethylene, methyl acrylate, and glycidyl methacrylate, such as LOTADER 8900 from Arkema Inc. The polymeric tie layer may contain additives, such as dyes and colorants.

In one preferred embodiment, the tie layer also contains an acrylic resin, and preferably an impart modified acrylic resin as used in the outer layer previously described. This acrylic resin/functionalized olefin acrylic polymer blend is formed as a melt blend or solvent blend.

The thermoplastic olefin substrate of the invention is formed of a thermoplastic polyolefin (TPO). A variety of TPO materials are commercially available, such as E-3000 grade TPO available commercially from Solvay Engineered Polymers and PD 801 grade TPO available commercially from Equistar Chemicals, LP. The TPO may be "neat" (that is, provided without any additives therein) or, more preferably, may be blended with virtually any additive conventionally employed in engineered resins generally. The TPO material may include one or more colorants, ultraviolet stabilizers, fillers, processing aids and the like as may be desired or necessary for particular end-use applications.

The composite of the invention may be made by several different means, including co-extrusion, film lamination, blown film extrusion, compression molding, coating, solvent coating, or by hot-pressing. In one embodiment a film of the acrylic and tie-layer are manufactured by coextrusion to form a film. The film is then applied to a TPO substrate by lamination, or by injection molding.

In a similar manner, the TPO and tie-layer may be co-extruded, and subsequently laminated onto the acrylic layer.

The three layers could be coextruded to form a multi-layer composite. This composite can be used as is, or can be laminated onto a substrate, such as another grade or same grade of TPO.

In another embodiment, a melt of the tie layer may be extruded between preformed sheets of the acrylic and TPO layers. This could be done just prior to lamination of the two sheets.

In the case of overmolding, if the mold is of simple shape, the injection molding of the substrate in the melt is sufficient to press the film against the wall of the mold. If the mold is of more complicated shape, to avoid stresses in the film and to ensure a good contact between the film and the walls of the molds, it is necessary to pre-form the film by thermoforming before putting it into the mold.

In addition to use on a TPO, the impact modified acrylic with functionalized olefin acrylic tie layer can also be adhered to other olefin-containing substrates, such as homopolymers and copolymers of olefin monomers and said olefinic homopolymers and copolymers alloyed with other polymers.

The composite of the invention has good adhesion and the adhesion is resistant to temperature cycling. Additionally, the composite of the invention provides UV protection, scratch resistance, paintability, and thermoformability to a TPO.

The composite is useful in many applications, including but not limited to: heavy gauge thermoforming markets, large part in-mold-decorating applications (such as bumpers, trim, and fascia for cars and trucks), and external cladding elements.

EXAMPLES

Example 1

A three layer film is formed by coextrusion, with extruder processing conditions around 450° F.-500° F., and extruder die-temperatures of around 450° F.-500° F., consisting of Impact acrylic/LOTADER 8900/TPO, and then laminating the film unto TPO.

Example 2

The following structures can be prepared within the scope of the invention:

| Structure A1 | Structure A2 | Structure A3 |
|---|---|---|
| Clear PMMA 1 mil | Clear PMMA 2.5 mil | Colored PMMA 4 mil |
| Colored Lotader 4 mil | Colored Lotader 2.5 mil | Clear Lotader 1 mil |

LOTADER = LOTADER 8900 = PE/PMA/PGMA

The color can be added either to the cap or the tie layer.
The film is then applied to a TPO substrate by lamination.
The acrylic is impact modified acrylic containing 3-60 wt % of a three stage core shell BA based impact modifier.

Example 3

Three Layer Film

A three-layer film is produced by coextrusion:

| Structure B |
|---|
| Clear PMMA 1 mil |
| Colored PMMA 3 mil |
| Clear Lotader 1 mil |

The film is laminated onto a TPO substrate.

Example 4

Comparative Adhesion of Three Layer Structure

In the below table 1, we compare three effects: the importance of the LOTADER 8900 tie-layer (which if it is not used, adhesion is poor), and the improved benefit of the impact acrylic as the top layer versus standard non-impact modified acrylic, in addition to the benefit of a tie-layer consisting of a blend of the LOTADER 8900 and impact acrylic. The impact acrylic as the top layer versus a standard non-impact modified acrylic top layer leads to an overall improved composite in terms of adhesion between all the layers. The impact acrylic/LOTADER 8900 tie-layer improves the three-layer composite even further by helping to match the rheology of the middle layer to the other two outer layers and the both the aesthetics of the three-layer composite in terms of appearance and processing characteristics is vastly improved.

A three layer sheet is formed by coextrusion, with extruder processing conditions around 450° F.-500° F., and extruder die-temperatures of around 450° F.-500° F., consisting of Impact acrylic/LOTADER 8900/TPO and Impact acrylic/(LOTADER 8900/SOLARKOTE H melt blend)/TPO. Plexiglas® V920 and Solarkote® H are acrylic resins sold by Altuglas International, a subsidiary of Arkema Inc.

The tie-layer(s) comprised of LOTADER 8900/SOLARKOTE H can be isolated as pellets and is prepared via melt blending on a twin-screw extruder at 450° F.-500° F., and extruder die-temperatures of around 450° F.-500° F. LOTADER 8900 blends with acrylic containing less than 15 weight percent Solarkote H cannot be processed and isolated as pellets. Note that in Example E, the tie-layer does not contain enough LOTADER 8900 to optimize the adhesion of the said layer to the TPO substrate, although adhesion is still "Good", but not "Excellent" as in Example D. In Example G, 20% of acrylic (with no impact modifier) is used in the tie-layer, adhesion is "Good", but not as "Good" as the comparative Example E—which contains 20% of impact acrylic in the tie-layer. In addition, the appearance of the Example G composite is not as aesthetically pleasing as the Example E composite.

| Example | Top layer | Middle layer | Substrate | Adhesion (to acrylic cap and TPO substrate) |
|---|---|---|---|---|
| A | Acrylic-Plexiglas® V920 | LOTADER 8900 | Solvay E1500 | Good |
| B | Acrylic-Plexiglas® V920 | None | Solvay E1500 | Poor |
| C | Impact Acrylic-Solarkote® H | LOTADER 8900 | Solvay E1500 | Excellent |
| D | Impact Acrylic-Solarkote® H | none | Solvay E1500 | Poor |
| E | Impact Acrylic-Solarkote® H | LOTADER 8900/Solarkote® H blend (80/20) | Solvay E1500 | Excellent |
| F | Impact Acrylic-Solarkote® H | LOTADER 8900/Solarkote® H blend (60/40) | Solvay E1500 | Good |
| G | Impact Acrylic-Solarkote® H | LOTADER 8900/Acrylic-Plexiglas® V920 blend (80/20) | Solvay E1500 | Good |

What is claimed is:

1. A multi-layer composite material consisting of three layers in the following order:
   a. an impact-modified acrylic polymer layer containing an acrylic polymer matrix and one or more impact modifiers;
   b. a tie layer comprising polymers, wherein said polymers consist of a blend of
      1) a functionalized olefin-acrylate, wherein said functionalized olefin acrylate in the tie layer consists of 1) ethylene or propylene units, or a mixture thereof as the olefin, 2) $C_{1-8}$ alkyl (meth)acrylate units, and 3) an unsaturated epoxide as the functionalization, and
      2) an impact modified acrylic consisting of
         a) an acrylic matrix polymer consisting of 60 to 100 weight percent of methyl methacrylate units, and 0-40 weight percent of other acrylic and methacrylate monomer units based on the total monomer units in the acrylic matrix polytner, and
         b) from 3 to 60 percent by weight of one or more impact modifiers and
   c. a thermoplastic olefin substrate.

2. The multi-layer composite material of claim 1 wherein said impact modifier in said impact modified acrylic polymer layer and in said tie layer is a core/shell morphology.

3. The multi-layer composite material of claim 1 wherein said impact modified acrylic polymer layer comprises the acrylic polymer matrix consisting of 60 to 100 percent by weight of methylmethacrylate units and from 0 to 40 percent by weight of other acrylate and methacrylate monomer units, based on the total monomer units in the acrylic polymer matrix.

4. The mufti-layer composite material of claim 1 wherein said impact modified acrylic polymer layer contains no acrylic polymer having acid anhydride units.

5. The multi-layer composite material of claim 1 wherein said functionalized olefin-acrylate is a terpolymer of ethylene, methyl acrylate and glycidyl methacrylate.

6. A process for forming the multi-layer composite material of claim 1 comprising:
   a. forming by coextrusion a multi-layer film comprising
      1) the impact acrylic polymer layer containing the acrylic polymer matrix and the one or more impact modifiers, wherein said acrylic polymer matrix consists of 60 to 100 weight percent of methyl methacrylate units, and 4-40 weight percent of other acrylic and methacrylate monomer units based on the total monomer units in the acrylic polymer matrix, and
      2) the tie layer; and
   b. laminating the multi-layer film onto the thermoplastic olefin substrate wherein said tie layer is between the impact-modified acrylic polymer layer and the thermoplastic olefin substrate.

7. A process for forming the multi-layer composite material of claim 1 comprising the step of coextruding the three layers comprising:
   1) the impact modified acrylic polymer layer,
   2) the tie layer and
   3) the thermoplastic olefin substrate.

* * * * *